May 29, 1928.
H. R. GERRARD
1,671,190
INDICATOR FOR STREET RAILWAY CARS
Filed Dec. 17, 1927
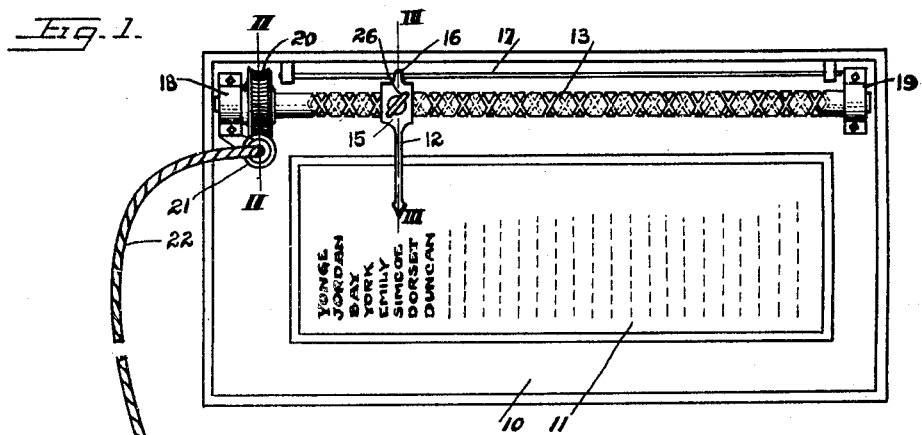
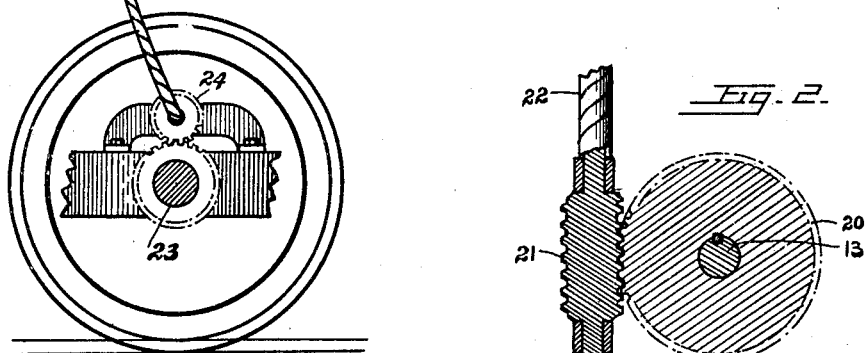
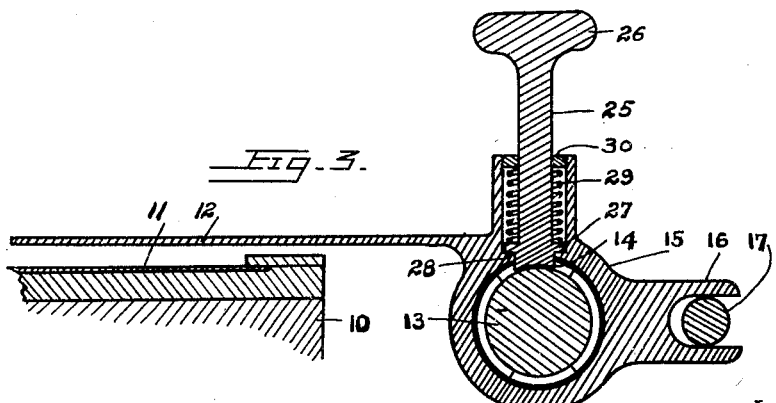
Inventor
HENRY ROTHWELL GERRARD
By Frederick C. Bromley
Attorney.

Patented May 29, 1928.

1,671,190

UNITED STATES PATENT OFFICE.

HENRY ROTHWELL GERRARD, OF TORONTO, ONTARIO, CANADA.

INDICATOR FOR STREET-RAILWAY CARS.

Application filed December 17, 1927. Serial No. 240,827.

The invention relates to improvements in indicators for street railway cars and the like as described in the present specification and shown in the accompanying drawings which form part of the same.

The invention has for its object the provision of an attachment for a street railway car or other passenger-carrying vehicle, which will indicate the names of intersecting streets, or stopping places of the vehicle over a given route. This is achieved by the provision of a casing or the like in which is exposed to view a strip of names, or other indicia of the intersecting streets or stops. A pointer progressively travels over the strip indicating the streets as they are reached; which pointer is actuated by mechanism connected to a rotating element of the conveyance, such as the live axle illustrated in the drawings hereinafter described in detail.

A salient feature of the invention is that the pointer automatically reverses at the end of the route in order to indicate on the return run.

A further distinctive feature resides in the provision for setting the pointer at any place on the name strip or for resetting it in the event that a deviation is made when on any trip which would cause the pointer to indicate incorrectly.

The accompanying drawings indicate one practical mode of carrying the invention into effect, in which Figure 1 is an elevation of the invention shown geared to a live axle of a street railway car or other vehicle.

Figure 2 is a sectional view of reduction gears taken on the line 2—2 of Figure 1.

Figure 3 is a transverse section taken on the line 3—3 of Figure 1 and illustrates the pointer and its operating mechanism.

Referring to the drawings, it is proposed that some sort of casing 10 shall be employed to hold the name-strip or other indicia-bearing element 11 and the pointer 12 together with its associated operating mechanism. The casing may be of suitable design and will be placed in the most conspicuous location in the vehicle where it can be observed by the passengers.

The operating mechanism for the pointer herein disclosed comprises a feed screw 13 of the reversal type, i. e. one having right and left hand threads merged into each other at the ends to form an endless path for a follower 14, Fig. 3.

The follower is of the kind usually employed with this type of feed screw, hence a detailed description is deemed to be unnecessary. It is housed in a sleeve 15 slidably mounted on the feed screw, said sleeve being constructed integrally with or secured to the pointer 12 so as to travel axially of the screw and parallel to the name-strip. With a view to holding the sleeve against rotation it is supplied with a bifurcated projection 16 that embraces a rod 17 rigidly secured in the casing 10.

The feed screw is supported in bearings 18, 19; and carries a worm wheel 20 that meshes with a worm 21. The worm is connected to a flexible shaft 22 which leads to one of the live axles, indicated at 23, and to which it is operably connected by gearing 24. It is manifest that reduction gearing other than that shown will have to be introduced in the transmission in order to secure the requisite ratio between the source of power and the feed screw, however such reduction gearing is conventional to the art and therefore is not a part of the present invention.

Adverting to the means for setting or resetting the pointer at any particular location on the name-strip, this mechanism consists of supplying the follower 14 with an integral shank 25 terminating in a handle 26. This shank has a collar 27 in the vicinity of the follower, one face of which engages an annular shoulder 28 of the sleeve 15. The other face thereof is engaged by a coil spring 29 that is compressed by the retaining ring 30 screw fitted to the sleeve.

It will be understood that to manually shift the pointer along the name strip it is merely necessary to grasp the handle 26 and pull it, thus disengaging the follower. The handle is held raised and the sleeve moved to the new setting of the pointer whereupon it is released, allowing the follower to be re-engaged.

In the operation of the invention, when the vehicle is set in motion the flexible shaft transmits power to the feed-screw by means of the reduction gearing. The pointer traverses the name-strip progressively indicating the names of stops or streets in its path which correspond to those intersected by the vehicle when passing over its route.

Having now described the preferred form of the embodiment of the invention capable of carrying the same into practical opera- tion, it is distinctly understood that such changes and modifications may be resorted to as may fairly come within the spirit and scope of the invention and claims hereinafter following.

What I claim is:—

1. In an indicating device of the class described, a name strip, a pointer associated therewith, a feed screw operably supporting the pointer, said feed screw being of the reversal or Horsfall type; a follower carried by the pointer and engaged with the groove of the screw thread, bearings constituting a mounting for the feed screw, reduction gearing connected to said feed screw, a flexible shaft extending from the gearing, and means operably associating the flexible shaft with a rotatable part of a conveyance so as to take off power therefrom.

2. In an indicating device of the class described, a name strip, a pointer associated therewith, a feed screw of the reversal or Horsfall type, a sleeve slidably mounted upon the feed screw, said sleeve being rigidly attached to the pointer, a follower projecting from the sleeve and engaging the thread of the feed screw, a stationary rod extending parallel to the screw, a bifurcated projection carried by the sleeve and engaged with the rod to prevent rotation of the sleeve, and means for operably associating the feed screw with a rotatable part of a conveyance so as to take off power therefrom.

3. In an indicating device of the class described, a name strip, a pointer associated therewith, a feed screw of the reversal or Horsfall type, a sleeve slidably encompassing the screw, said sleeve being rigidly attached to the pointer, a follower projecting from the sleeve and engaging the thread of the screw, means precluding rotation of the sleeve, a shank integrally extending from the follower and terminating in a handle, a collar carried by the shank adjacent to the follower, a shoulder formed on the sleeve to normally engage one face of the collar, a coil spring engaging the other collar face, and a retaining ring exerting compressive force on the spring.

Signed at Toronto, Canada, this 12th day of December, 1927.

HENRY ROTHWELL GERRARD.